(12) United States Patent
Schmid et al.

(10) Patent No.: US 6,506,136 B2
(45) Date of Patent: *Jan. 14, 2003

(54) TRANSMISSION

(75) Inventors: Jochen Schmid, Alfdorf-Rienharz (DE); Rainer Eidloth, Bamberg (DE); Carsten Weinhold, Bühl-Neusatz (DE); Roland Hölz, Bühl-Neusatz (DE); Bernhard Walter, Oberkirch (DE)

(73) Assignee: LuK Geriebe-Systeme GmbH, Buhl/Baden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/850,417

(22) Filed: May 7, 2001

(65) Prior Publication Data

US 2001/0031678 A1 Oct. 18, 2001

Related U.S. Application Data

(62) Division of application No. 09/265,101, filed on Mar. 9, 1999, now Pat. No. 6,241,635.

(30) Foreign Application Priority Data

Mar. 10, 1998 (DE) .......................................... 198 10 172

(51) Int. Cl.$^7$ .......................... F16H 59/00; F16H 61/00; F16H 63/00

(52) U.S. Cl. .......................................... 474/18; 474/28

(58) Field of Search .............................. 474/11, 18, 28, 474/70

(56) References Cited

U.S. PATENT DOCUMENTS

| 5,046,991 | A |   | 9/1991 | Friedmann | 474/18 |
|---|---|---|---|---|---|
| 5,169,365 | A |   | 12/1992 | Friedmann | 474/18 |
| 5,217,412 | A |   | 6/1993 | Indlekofer et al. | 474/69 |
| 5,295,915 | A |   | 3/1994 | Friedmann | 474/18 |
| 5,468,191 | A | * | 11/1995 | Monahan | 474/8 |
| 5,667,448 | A |   | 9/1997 | Friedmann | 474/18 |
| 5,674,155 | A |   | 10/1997 | Otto et al. | 477/176 |
| 5,711,730 | A | * | 1/1998 | Freidman et al. | 474/18 |
| 6,123,634 | A | * | 9/2000 | Faust et al. | 474/18 |
| 6,241,635 | B1 | * | 6/2001 | Schmid et al. | 474/11 |

FOREIGN PATENT DOCUMENTS

DE        43 42736        6/1995

* cited by examiner

Primary Examiner—Sherry Estremsky
Assistant Examiner—Tisha D. Lewis
(74) Attorney, Agent, or Firm—Darby & Darby

(57) ABSTRACT

A continuously variable transmission wherein each of two parallel shafts carries a pulley having a fixed flange and a second flange movable axially of the shaft toward and away from the respective fixed flange. An endless torque transmitting chain or belt is trained over the two pulleys. At least one flange of at least one of the pulleys is assembled of two or more parts which consist of sheet metal and are welded and/or otherwise affixed to each other.

20 Claims, 8 Drawing Sheets

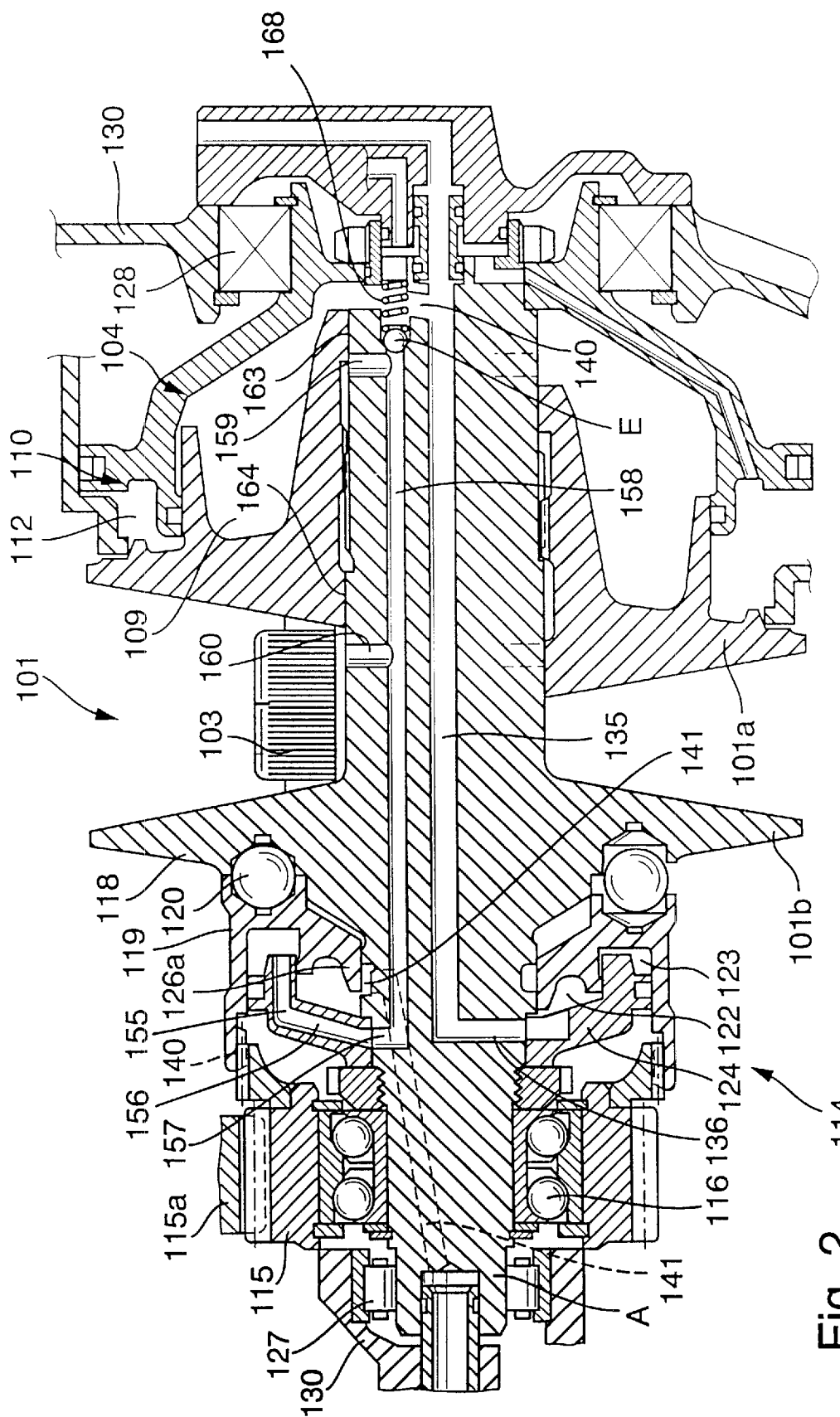

TRANSMISSION

This is a division of application Ser. No. 09/265,101, filed Mar. 9, 1999, now U.S. Pat. No. 6,241,635 which is hereby incorporated herein by reference in its entirety.

BACKGROUND OF THE INVENTION

The invention relates to change speed transmissions in general, and more particularly to improvements in transmissions of the type known as continuously variable transmissions (CVT) which can be utilized with advantage in the power trains of motor vehicles, e.g., to transmit torque from the output element of a prime mover (such as the camshaft or the crankshaft of an internal combustion engine) to the front and/or rear wheels of a motor vehicle.

A continuously variable transmission normally comprises a first shaft which can receive torque from a prime mover, a second shaft which is or can be parallel with the first shaft, an adjustable pulley or sheave on each of the two shafts, and an endless flexible element (such as a chain or a belt and hereinafter referred to as chain) trained over the two pulleys to transmit torque from the first shaft to the second shaft when the first shaft is driven by the prime mover. The two pulleys are adjustable and, to this end, each pulley comprises a first conical flange which is affixed to the respective shaft, and a second conical flange which is rotatable with the first flange and is movable axially relative to the respective shaft toward and away from the respective first flange. Such adjustability of the pulleys enables the chain to move one of its looped portions radially inwardly toward one of the shafts while its other looped portion moves radially outwardly and away from the other shaft, or vice versa.

It is already known to make at least one flange of each adjustable pulley of one or more parts at least one of which consists of a metallic sheet material. This contributes to lower cost and to a reduction of the overall weight of the transmission. The axially movable flanges normally cooperate with cylinder and piston units which define with the movable flanges one or more plenum chambers for the reception of a hydraulic fluid which compels the respective mobile flange to move axially toward the associated axially fixed flange. Such movability of the axialy movable flanges is utilized to establish a desired amount of friction between the chain and the adjacent conical surfaces of the flanges (this ensures that the chain shares the angular movements of the flanges or that the chain is entrained with a desired degree of slip) Axial movability of one flange of each pulley is further utilized to select a desired transmission ratio by moving one looped portion of the chain away from the periphery of the respective shaft while the other looped portion of the chain is compelled to move toward the periphery of the associated shaft.

Continuously variable transmissions are often preferred over automatic transmissions which employ a hydrokinetic torque converter in combination with a so-called bypass or lockup clutch. The reason is that a power train employing a continuously variable transmission affords a greater comfort to the occupant or occupants of the motor vehicle because the shifts into different gear ratios invariably take place gradually without any or without appreciable shocks. Moreover, the utilization of a continuously variable transmission in the power train entails substantial savings in fuel requirements of the motor vehicle.

Published German patent application Serial No. 43 42 736 A1 discloses a continuously variable transmission wherein the axially shiftable flange of each adjustable pulley is located between the corresponding axially fixed flange and a support which is affixed to the respective shaft. The support and the adjacent axially movable flange define a plenum chamber which can receive pressurized hydraulic fluid to move the axially movable flange toward the respective fixedly mounted flange. The flanges are or can be made of a metallic sheet material, and this can entail considerable savings in the initial cost of the adjustable pulleys. However, the axially movable flanges and the adjacent fixedly mounted supports are designed to define a single plenum chamber for each of the two pulleys. This is unsatisfactory in those types of continuously variable transmissions wherein each axially shiftable flange must be adjusted by a first unit to select the frictional engagement with the adjacent portion of the chain as well as by a second unit which enables the transmission to select the desired speed ratio, i.e., any one of an infinite number of different speed ratios.

OBJECTS OF THE INVENTION

An object of the invention is to provide a novel and improved continuously variable transmission, particularly for use in the power trains of motor vehicles.

Another object of the invention is to provide novel and improved adjusting means for the adjustable flanges of pulleys which can be utilized in continuously variable transmissions.

A further object of the invention is to provide novel and improved fluid-operated adjusting systems for the adjustable flanges of pulleys in continuously variable transmissions.

An additional object of the invention is to provide novel and improved adjustable pulleys for use in continuously variable transmissions.

Still another object of the invention is to provide a power train which is designed for use in motor vehicles and embodies a continuously variable transmission of the above outlined character.

A further object of the invention is to provide a transmission which constitutes an improvement over and a further development of continuously variable transmissions of the type disclosed in published German patent application Serial No. 43 42 736 A1.

Another object of the invention is to provide a simple, compact and inexpensive continuously variable transmission which can be utilized as a superior substitute for heretofore known transmissions of such character in the power trains of motor vehicles.

An additional object of the invention is to provide novel and improved combinations of axially movable conical flanges and moving means therefor for use in power trains employing continuously variable transmissions.

SUMMARY OF THE INVENTION

One feature of the present invention resides in the provision of a transmission, such as a continuously variable transmission, which comprises a shaft rotatable about a predetermined axis, and a pulley having a first flange affixed to the shaft and a second flange rotatable with and movable axially of the shaft toward and away from the first flange. The flanges have confronting conical surfaces which surround an annular space having a width, as seen in the axial direction of the shaft, which varies in response to movement of the second flange relative to the first flange. At least one of the flanges comprises a plurality of interconnected components consisting at least in part of a metallic sheet material. The transmission further comprises an endless flexible element which is trained over the pulley and includes a looped portion received in the aforementioned annular space, and means for moving the second flange. The moving means includes a support which is affixed to the second flange and the latter is disposed between the support and the first flange. The support and the second flange define a plurality of annular plenum chambers, and the moving means further comprises means for sealing the chambers; such sealing means extends in at least one of a plurality of directions including radially and axially of the shaft.

The at least one flange is or can constitute the axially movable second flange; such second flange has a side which confronts the support and is or can be defined by at least one of the components which consist of or contain sheet metal. The at least one component can comprise a conical disc and the support can comprise a supporting part non-rotatably mounted on the shaft, a frustoconical part connected with a median portion of the at least one component and extending from the at least one component axially end radially of the shaft toward the periphery of the shaft, and a second component remote from the axis of the shaft and defining with the frustoconical part one of the plenum chambers.

In accordance with a presently preferred embodiment, the second flange comprises a frustoconical component which is adjacent the annular space, and the support is non-rotatably mounted on the shaft and includes a frustoconical first portion extending from the median portion of the frustoconical component toward the periphery of the shaft, a second portion which is at least substantially parallel to the axis of the shaft and extends from the frustoconical component away from the annular space, and a third portion which extends from the second portion radially outwardly and away from the shaft. One of the plenum chambers surrounds the second portion of the support and another chamber is located radially inwardly or outwardly of the one chamber.

In accordance with another presently preferred embodiment, the at least one flange is the second flange and the second flange comprises a frustoconical component adjacent the annular space. The support comprises a frustoconical first portion extending from a median portion of the frustoconical component toward the periphery of the shaft, a second portion which extends in substantial parallelism with the axis of the shaft and away from the annular space, and a third portion which is bent radially outwardly from the second portion. One of the chambers is defined, at least in part, by the first and second portions of the support, and another chamber is defined by the second and third portions of the support.

The support can consist of a single piece of sheet metal; alternatively, the support can be assembled of a plurality of parts each of which is made or at least some of which are made of sheet metal.

If the support for at least one of the flanges includes first, second and third portions which consist of a metallic sheet material and are disposed at different radial distances from the axis of the shaft, the second and third portions of the support can be made of one piece separately from the third portion of the support.

The second flange can comprise a frustoconical component having a substantially circular radially inner portion which surrounds; and is movable axially of the shaft. Alternatively, the radially inner portion of the frustoconical component of the second flange can have a polygonal profile surrounding and being movable axially of a complementary polygonal profile on the shaft.

At least one of the flanges can include a radially inner portion having a cylindrical internal surface which surrounds a complementary external surface on the shaft. The inner portion merges into a substantially frustoconical component forming part of the respective flange.

At least one of the flanges can comprise a frustoconical component which is adjacent the annular space and at least one substantially frustoconical stabilizing portion for the frustoconical component.

The first flange can comprise a frustoconical component which is adjacent the annular space, and a supporting device for the frustoconical component. The shaft for such first flange can have a first substantially annular shoulder which abuts a portion of the frustoconical component and a second substantially annular shoulder abutting a portion of the supporting device.

At least one of the flanges can comprise a frustoconical component adjacent the annular space and a body of foam which is adjacent and attached to a surface of the frustoconical component facing away from the annular space.

The first flange can include a portion which is remote from the shaft, and a gear which is provided on such remote portion of the first flange.

The second flange can include a frustoconical component which is adjacent the annular space, and a member which consists, at least in part, of sheet metal and forms part of a torque sensor. The member is adjacent a side of the frustoconical component which faces away from the annular space.

It is also possible to design the transmission in such a way that the first flange includes a frustoconical component adjacent the annular space, and a member consisting at least in part of sheet metal and forming part of a torque sensor. The member is adjacent a side of the frustoconical component which faces away from the annular space.

Another feature of the invention resides in the provision of a transmission, such as a continuously variable transmission, which comprises a shaft rotatable about a predetermined axis, and a pulley having a first flange affixed to the shaft and a second flange which is compelled to rotate with and is movable axially of the shaft toward and away from the first flange. In accordance with a feature of the instant invention, at least one of the flanges comprises a plurality of interconnected components (or groups of two or more one-piece components each) consisting at least in part of sheet metal. Such transmission further comprises an endless flexible torque transmitting element (such as an endless chain or an endless belt) having a portion which is trained over the pulley and is disposed between the two flanges.

It is possible to assemble each of the two pulleys of two or more components at least one of which is made of sheet metal, e.g., in a stamping, upsetting, cutting, embossing or other suitable machine.

The construction of one of the two flanges can differ from that of the other flange.

The improved transmission can further comprise a torque sensor, and at least one of the flanges can include at least one portion which forms part of the torque sensor. This torque sensor can receive torque from a suitable prime mover, such as the combustion engine of a motor vehicle, and can define two plenum chambers which ar connectable with or sealable from each other.

The novel features which are considered as characteristic of the invention are set forth in particular in the appended claims. The improve transmission itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 2 is a fragmentary axial sectional view of a continuously variable transmission which constitutes a first modification of the transmission shown in FIGS. 1 and 1a;

FIG. 3 is a fragmentary axial sectional view of a continuously variable transmission constituting a second modification of the transmission which is shown in FIGS. 1 and 1a;

FIG. 4 is a fragmentary axial sectional view of a continuously variable transmission constituting a third modification of the transmission shown in FIGS. 1 and 1a;

FIG. 5b is a similar view of a modification of the structure shown in FIG. 5a;

DESCRIPTION OF PREFERRED EMBODIMENTS

Figure 1:
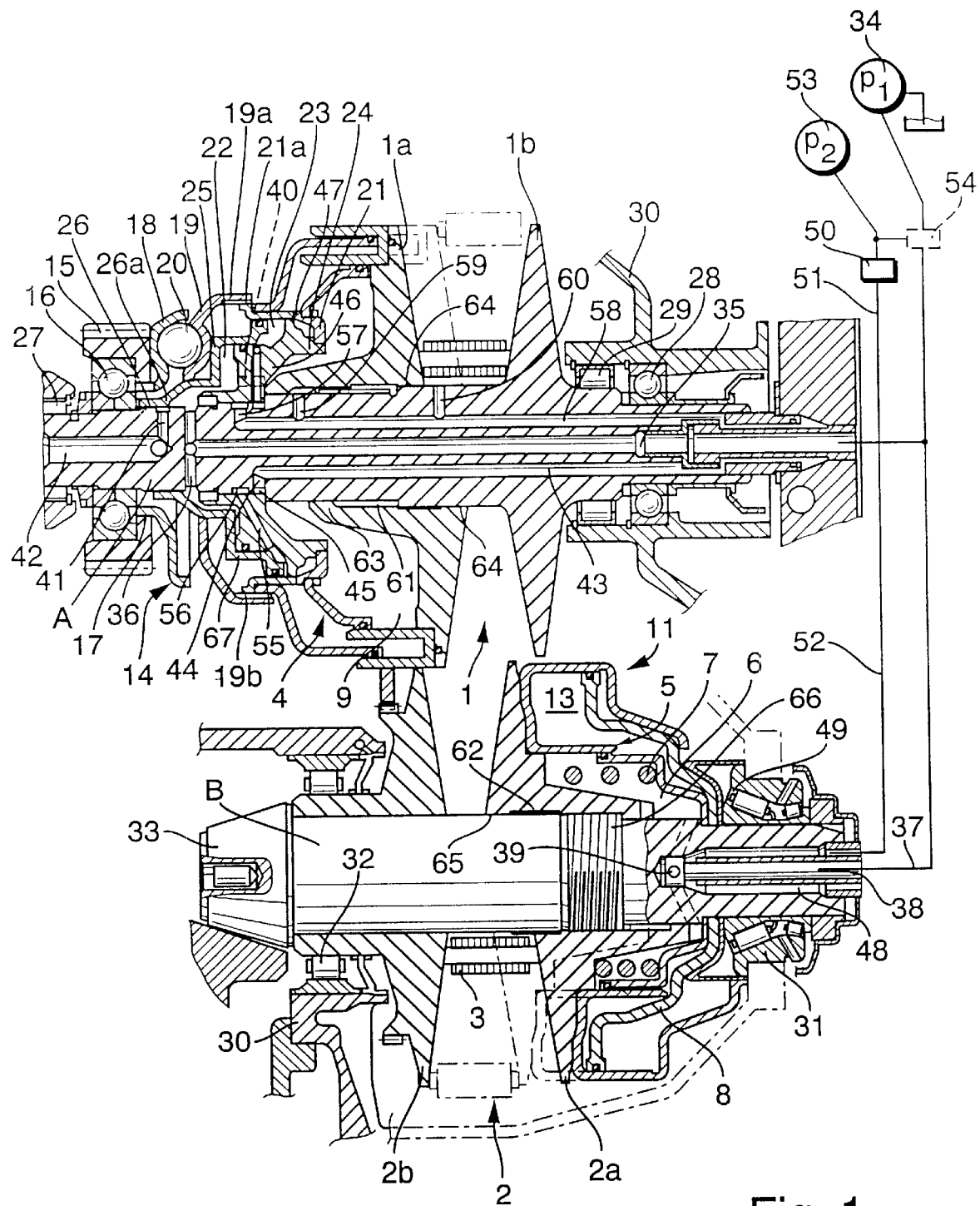
FIG. 1 is a fragmentary partly axial sectional and partly diagrammatic elevational view of a continuously variable transmission which embodies one form of the present invention.
Figure 1A:
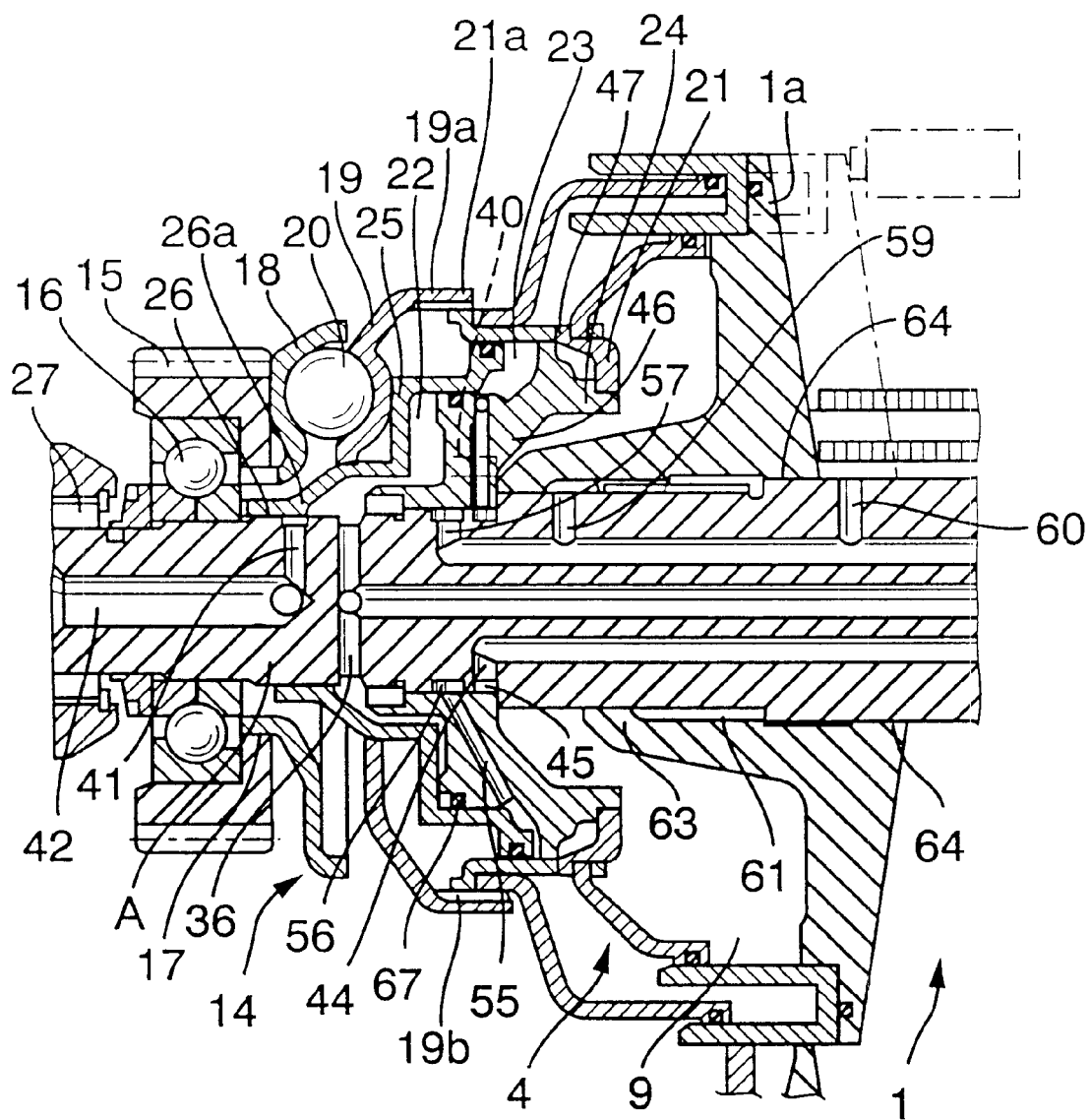
FIG. 1a is an enlarged view of a detail of the continuously variable transmission which is shown in FIG. 1.

FIGS. 1 and 1a show all relevant details of a continuously variable transmission (CVT) which comprises a first shaft A adapted to receive torque from the rotary output element of a prime mover (such as the camshaft or crankshaft of an internal combustion engine in the power train of a motor vehicle) and carrying a first adjustable pulley or sheave 1, and a second shaft B adapted to drive one or more torque receiving units (e.g., a friction clutch or a differential in the power train of the motor vehicle) and carrying a second. adjustable pulley or sheave 2. An endless flexible element 3 (e.g., a chain or a belt and hereinafter called chain) is trained over the pulleys 1 and 2 to transmit torque between the shafts A and B when one of these shafts is driven and is to transmit torque to the other shaft.

The pulley 1 comprises a conical flange 1b which is fixedly secured to or of one piece with the shaft A, and a conical flange 1a which is non-rotatably mounted on but is movable axially of the shaft A toward and away from the flange 1b. Analogously, the pulley 2 comprises a conical flange 2b which is fixedly secured to or of one piece with the shaft B, and a conical flange 2a which must share all angular movements of but is movable axially along the shaft B toward and away from the flange 2b. The shafts A and B are or can be at least substantially parallel to each other.

When the chain 3 assumes the phantom-line position shown in the upper half of FIG. 1 and the solid-line position shown in the lower half of FIG. 1, the transmission is in overdrive, i.e., the shaft A drives the shaft B at a maximum speed. Inversely, when the chain 3 assumes the solid-line position shown in the upper half of FIG. 1 (nearest to the shaft A) and phantom-line position shown in the lower half of FIG. 1 (at a maximum radial distance from the shaft B), the transmission is in underdrive, i.e., the RPM of the shaft B is a fraction of the RPM of the shaft A.

The transmission further comprises an adjusting unit 4 which serves to bias the confronting conical surfaces of the flanges 1a, 1b axially toward each other, i.e., into frictional engagement with the adjacent edge faces of the chain 3. Analogously, the transmission of FIGS. 1 and 1a comprises an adjusting unit 5 which serves to bias the confronting conical surfaces of the flanges 2a, 2b against the adjacent edge faces of the chain 3. Each of the units 4, 5 is a cylinder-and-piston unit having plenum chamber adapted to receive a pressurized hydraulic fluid which urges the respective axially movable flange 1a or 2a toward the adjacent axially fixed flange 2a or 2b. The chamber 6 of the adjusting cylinder and piston unit 5 confines a coil spring 7 or an analogous energy storing element which is installed in an at least partially stressed condition so that it permanently urges the axially movable flange 2a toward the axially fixed flange 2b. It will be appreciated that the amount of energy stored by the coil spring 7 assumes a maximum value when the lower actuate portion of the chain 3 assumes the solid-line position of FIG. 1 (i.e., at a minimum distance from the peripheral surface of the shaft B) because the axially movable flange 2a is then located at a maximum axial distance from the axially fixed flange 2b. In other words, the amount of energy stored by the coil spring 7 (i.e., the bias of the spring 7 upon the flange 2a) increases proportionally with the increasing ratio of the RPM of the shaft B to the RPM of the shaft A. In the embodiment of FIG. 1, one end convolution of the coil spring 7 reacts directly against the axially movable flange 2a and the other end convolution of the coil spring 7 (which is installed in the plenum chamber 6 of the cylinder-and piston unit 5) bears directly upon a member 8 which is fixedly secured to the shaft B, i.e., to the flange 2b.

The adjusting (cylinder-and-piston) units 4, 5 respectively operate in parallel with two additional cylinder-and-piston units 10, 11 which serve to change the speed ratio of the continuously variable transmission including the shafts A, B and the pulleys 1, 2. The units 10, 11 respectively comprise plenum chambers 12, 13 one of which receives pressurized hydraulic fluid from a pump or another suitable source when the other is permitted to discharge fluid into a sump or another suitable receptacle, and vice versa. When the volume of the chamber 12 is increased, the axially movable flange 1a moves nearer to the axially fixed flange 1b and the corresponding looped portion of the chain 3 is caused to move radially outwardly and away from the peripheral surface of the shaft A. At the same time, the chamber 13 is connected with the sump so that the flange 2a can move axially of the shaft B and away from the flange 2b so that the corresponding looped portion of the chain can move nearer to the peripheral surface of the shaft B whereby the RPM of the shaft B increases if the RPM of the shaft A remains unchanged.

The means for regulating the flow of pressurized fluid into the chamber 12 or 13 with simultaneous evacuation of fluid from the chamber 13 or 12 comprises one or more suitable valves, e.g., valves of the type disclosed in published German patent application Serial No. 40 36 683. FIG. 2 of this publication shows a square-head gate valve or slide valve 36 which cooperates with a source (pump) of pressurized fluid and can be put to use in the continuously variable transmission of FIGS. 1 and 1a.

The transmission of FIGS. 1 and 1a further comprises a, hydromechanical torque sensor 14 which is designed to generate or select a fluid pressure as a function of transmitted torque. The purpose of the torque sensor 14 is to transmit torque from the output element of a prime mover, e.g., from a driver pinion 15, to the input shaft A and hence to the primary adjustable pulley 1. The driver pinion 15 is rotatably mounted on the shaft A by way of an antifriction bearing 16 (e.g., a ball bearing) and is form-lockingly connected with a cam disc 18 of the torque sensor 14. The cam disc 18 abuts the driver pinion 15 and is non-rotatably connected with the latter by a pair of mating gears, 17, such as an internal gear and a mating spur gear.

In addition to the cam disc 18, the torque sensor 14 comprises an axially movable second cam disc 19. The cam discs 18, 19 have confronting cam faces in the form of ramps or the like which contact one or more spreading elements 20 in the form of spheres, rollers or the like. The cam disc 19 is non-rotatably but axially movably mounted on the shaft A. To this end, the cam disc 19 comprises a radially outer portion 19a extending axially of the shaft A and away from the spreading elements 20 and provided with an annulus of internal teeth 19b mating with the the external teeth 21a of a member 21 which is fixedly secured to the shaft A (i.e., the member 21 is compelled to rotate with and cannot move axially of the shaft A).

The torque transmitting teeth 19b and 21a are arranged to mesh in such a way that the cam disc 19 and the member 21 are free to move realative to each other in the axial direction of the shaft A.

The component parts of the torque sensor 14 define two axially spaced-apart plenum chambers 22 and 23. The plenum chamber 22 is defined in part by an annular member 24 which is rigidly connected to the shaft A and by two members or parts 25, 26 which are carried by or form part of the cam disc 19. In addition to being axially offset relative to the plenum chamber 22, the plenum chamber 23 is located at least in part radially outwardly of the plenum chamber 22; this second plenum chamber 23 of the torque sensor 14 is defined in part by the aforementioned annular member 24 as well as by the aforementioned substantially sleeve-like member 21 and the aforementioned member or part 25. The latter is movable axially of the shaft A and can be said to act as a piston or plunger.

The shaft A is rotatably mounted in a housing 30 of the transmission by way of a needle bearing 27 located at that side of the torque sensor 14 which faces away from the pulley 1, by a thrust bearing 28 which can take up axial and radial stresses and is located at that side of the pulley 1 which faces away from the torque sensor 14, and a roller bearing 29 which is designed to take up radial stresses (or primarily radial stresses) and is located between the thrust bearing 28 and the axially fixed flange 1b of the pulley 1.

The shaft B is rotatably mounted in the housing 30 by way of a twin conical roller bearing 31 which is adjacent the cylinder-and-piston units 5, 11, and by a roller bearing 32 adjacent that side of the flange 2b which faces away from the flange 2a. The bearing 31 is designed to take up radial forces as well as axial forces acting in directions to the right and to the left, as viewed in FIG. 1. That end portion of the shaft B which is located to the left of the flange 2b is provided or connected with a bevel gear 33 arranged to transmit torque to an adjacent constituent of the power train in a motor vehicle, e.g., to a differential (not shown).

FIG. 1 further shows a pump 34 constituting a source of pressurized hydraulic fluid enabling the torque sensor 14 to generate a fluid pressure which is modulated at least as a function of the transmitted torque and is required to urge the flanges 1a, 1b and 2a, 2b of the pulleys 1 and 2 against the adjacent edge faces of the respective actuate portion of the chain 3. The outlet of the pump 34 is connected to an axial channel or bore 35 provided in the shaft A and communicating with at least one radially extending channel 36 which communicates or can communicate with the plenum chamber 22 of the torque sensor 14. The outlet of the pump 34 is further connected with a conduit 37 serving to admit pressurized hydraulic fluid into an axial blind bore or channel 38 of the shaft B. The axial channel 38 communicates with one or more substantially radially extending channels 39 provided in the shaft B and communicating or adapted to communicate with the chamber 6 of the adjusting unit 5.

A channel 40 (not located in the plane of FIG. 1 and therefore indicated by broken lines) serves to establish communication between the plenum chamber 9 of the adjusting unit 4 and the plenum chamber 22 of the torque sensor 14. The channel 40 is formed in the aforementioned annular member 24 which is rigidly connected with the shaft A; this channel establishes a permanent communication between the plenum chambers 9 and 22.

The shaft A is further provided with at least one fluid evacuating channel or bore 41 which communicates or can communicate with the plenum chamber 22 and the effective cross-sectional area of which can be varied as a function of one or more parameters, e.g., as a function of the magnitude of the torque being transmitted by the torque sensor 14. The channel 41 extends substantially or exactly radially of the shaft A and communicates with an axial blind bore or channel 42 also provided in the shaft A and serving to evacuate fluid (such as oil) to various component parts forming part of the prime mover and requiring regular or intermittent lubrication. Such component parts can receive lubricant directly from the channel 42 and/or by way of one or more conduits in the form of pipes, hoses or the like (not shown).

The radially inner portion 26a of the cam disc 19 cooperates with the adjacent portion of the shaft A to constitute a valving element which is movable axially of the shaft A and serves to expose or seal the radially outer end of the radially extending channel 41 for the flow of hydraulic fluid from the plenum chamber 22 of the torque sensor 14. The extent to which the valving element 26a can expose or seal the radially outer end of the channel 41 depends, at least, upon the magnitude of the torque being transmitted by the torque sensor 14, i.e., the shaft A and the portion 26a of the cam disc 19 cooperate to act as a flow restrictor or throttle which ensures that the rate of flow of hydraulic fluid from the plenum chamber 22 depends upon the torque being transmitted between the cam discs 18, 19. The cam disc 19 is the mobile constituent (piston of the flow restrictor or valve) and its axial position relative to the shaft A determines the magnitude of fluid pressure in the chamber 22, i.e., the relationship between the pressure of fluid being supplied by the pump 34 and the actual fluid pressure in the chamber 22. Because the plenum chamber 22 communicate with the chamber 9 and (by way of channels 35, 36, 37, 38 and 39) with the chamber 6, the axial position of the radially inner portion 26a of the disc cam 19 determines the fluid pressure in the chamber 22 as well as in the chambers 9 and 6.

Since the cylinder-and-piston units 4, 5 operate in parallel with the respective cylinder-and-piston units 10, 11, those forces which are generated by pressure furnished by the torque sensor 14 and acting upon the axially movable flanges 1a, 2a are added to the forces acting upon the flanges 1a, 2a due to the pressure of fluid in the plenum chambers 12, 13 and serving to select the speed ratio of the transmission.

The plenum chamber 12 of the cylinder-and-piston unit 11 receives pressurized fluid by way of a channel 43 which is provided in the shaft A and communicates with the chamber 12 by way of at least one channel 44 provided in the shaft A, extending radially outwardly from the channel 43 and communicating with an annular groove 45 provided in the periphery of the shaft A. The groove 45 communicates with at least one channel 46 provided in the annular member 24, extending substantially radially outwardly from the shaft A and communicating with the plenum chamber 22 by way of an opening 47 in the member 21.

The plenum chamber 13 of the cylinder-and-piston unit 11 can receive pressurized fluid by way of an annular channel 48 provided in the shaft B and surrounding the centrally located channel 38, and one or more channels 49 provided in the shaft B and communicating with the channel 48 as well as with the chamber 13.

The annular channels 43 and 48 which are respectively provided in the shafts A and B can receive pressurized fluid from a source 53 by way of conduits 52, 51. The conduit 52 contains at least one fluid flow regulating valve 50, e.g., a block of two or more valves. The source 53 (e.g., a pump analogous to the pump 34) can be omitted if the hydraulic system of the continuously variable transmission of FIGS. 1 and 1a comprises a pressure distributing system 54 (shown in FIG. 1 by broken lines because optional) which, when necessary, establishes communication between the outlet of the pump 34 and the conduits 51, 52. The system 54 can comprise one or more valves which can regulate the pressure and/or the quantity of hydraulic fluid flowing from the pump 34 into the conduits 51, 52.

When the flange 1a assumes the axial position shown in FIG. 1 by solid lines at a level above the shaft A (namely at a maximum axial distance from the axially fixed flange 1b), the plenum chamber 23 (which is connected in parallel with the plenum chamber 22) is sealed from the source (pump 34) of pressurized hydraulic fluid because at least one of the channels or bores 55, 56, 57, 58, 59 (which can establish communication between the pump 34 and the chamber 23) is then sealed or closed. On the other hand, when the flange 1a assumes the axial position shown in FIG. 1 above the shaft A by solid lines, a radial bore 60 extending radially outwardly from the channel 58 of the shaft A is exposed so that the pressure of fluid in the chamber 23 of the torque sensor 14 can assume a minimum value.

The pressure of fluid in the chamber 22 increases proportionally with and in response to an increase of the torque being transmitted to the shaft A. As already mentioned hereinabove, the pressure of fluid in the chamber 22 can be regulated by the control edge 26a forming part of the cam disc 19 and serving to regulate the flow of fluid from the chamber 22 into the fluid evacuating bore or channel 42 of the shaft A.

When the transmission is shifted into a higher speed ratio, the flange 1a is caused to move in a direction to the right (from the solid-line position to the phantom-line position shown in FIG. 1 at a level above the shaft A), i.e., nearer to the axially fixed flange 1b. This entails an axial movement of the flange 2a away from the axially fixed flange 2b, i.e., from the phantom-line to the solid-line position shown in FIG. 1 at a level below the shaft B. Such axial displacements of the flanges 1a and 2a cause the upper looped portion of the chain 1 shown in FIG. 1 to migrate radially outwardly and away from the periphery of the shaft A from the solid-line position to the phantom-line position shown in FIG. 1 at a level above the shaft A. At the same time, the lower looped portion of the chain 3 is caused to move from the phantom-line position to the solid-line position shown in the lower part of FIG. 1., i.e., from a. position at a greater radial distance to a position at a lesser (e.g., minimal) radial distance from the periphery of the shaft B.

The just discussed reduction of the speed ratio of the transmission including the shafts A, B, the pulleys 1, 2 and the chain 3 necessitates a manipulation of the valve 50 in the conduit 52 in order to admit presurized hydraulic fluid into the plenum chamber 12 of the unit 10 and to expel some fluid from the chamber 13, i.e., to reduce the quantity of fluid in the chamber 13.

The torque transmitting connection between the shaft A and the axialy movable flange 1a of the pulley 1 includes a pair of mating teeth 61, and an analogous set of mating teeth 62 is provided between the shaft B and the axially movable flange 2a of the pulley 2.

The upper looped portion of the chain 3 assumes the phantom-line position shown in the upper part of FIG. 1 (namely at a maximum radial distance from the periphery and axis of the shaft A) when the transmission is in overdrive. At such time, the lower looped portion of the chain 3 assumes the solid-line position shown in FIG. 1, i.e., at a minimum radial distance from the axis of the shaft B. At such time, the axially movable flange 1a is disposed at a minimum axial distance from the axially fixed flange 1b, and the axially movable flange 2a is located at a maximum axial distance from the axially fixed-flange 2b.

The transmission is set to operate in underdrive when the flange 1a is located at a maximum axial distance from the flange 1b (this is shown by solid lines in FIG. 1 at a level above the shaft A). At such time, the upper looped portion of the chain 3 is closely or immediately adjacent the shaft A, and the axially movable flange 2a assumes the phantom-line position shown in FIG. 1 below the shaft B in which the lower looped portion of the chain 3 is held at a maximum radial distance from the periphery of the shaft B.

FIG. 1 further shows that the internal surface of the axally movable flange 1 includes axially spaced apart centering portions 63, 64 and that the internal surface of the axially movable flange 2a is provided with similar centering portions 65, 66 which are spaced apart from each other in the axial diection of the shaft B. The centering portions 63, 64 directly surround the peripheral surface of the shaft A with negligible or minimal clearance, and the same holds true for the dimensions of the centering portions 65, 66 in comparison with the diameter of the shaft B. Those portions of the axially movable flange 1a which are provided with the centering portions 63, 64 and the adjacent portions of the shaft A constitute or act not unlike valves which regulate the flow of fluid through the radial channels 59, 60 of the shaft A. The axially movable flange 1a constitutes the mobile valving element of each of these valves. When the flange (mobile valving element) 1a is moved from the solid-line position and in a direction to the right (as viewed in FIG. 1), the radially outer end of the channel 60 is gradually sealed upon completion of a certain axial movement of the flange 1a toward the flange 1b, namely when the centering portion 64 overlies the radially outer end of the channel 60. At the same time, the centering portion 63 of the flange 1a seals the radially outer end of the channel 59. If the flange 1a continues to move toward the flange 1b, the centering portion 64 continues to seal the channel 60 but the centering portion 63 gradually exposes the radially outer end of the channel 59. This establishes a path for the flow of hydraulic fluid between the plenum chamber 9 of the cylinder-and-piston unit 4 and the channel 58; at the same time, the channels 57, 56 and 55 establish a path for the flow of fluid between the channel 58 and the plenum chamber 23 of the torque sensor 14.

Since the radially outer end of the channel 60 is at least substantially sealed by the centering portion 64 of the axially movable flange 1a, and since the plenum chamber 9 then communicates with the plenum chambers 22, 23 of the torque sensor 14, the pressure in these chambers is at least substantially identical, the same as in the chamber 6 which is connected with the chambers 22, 23 by the channel 35, conduit 37 and channel 38. Any differences between the pressures of bodies of fluid in the chambers 22, 23, 9 and 6 are attributable to friction between the fluid streams and the surrounding surfaces in the various channels and bores.

Owing to the transmission ratio-dependent connection between the plenum chambers 22 and 23, the axially effective area of the pressurized fluid cushion in the torque sensor 14 has been increased because the axially effective area of the plenum chamber 22 is added to that of the chamber 23. The result of such increase of the axially effective area (supporting surface) of the torque sensor 14 is that, with reference to a given torque, the pressure being built up by the torque sensor decreases at least substantially proportionally to the increase of the effective area which, in turn, denotes that the fluid pressure in the chambers 9 and 6, too, has been reduced accordingly. Thus, the improved torque sensor 14 renders it possible to superimpose a transmission-ratio-dependent modulation of fluid pressure upon a torque-dependent modulation of the fluid pressure. Accordingly, the illustrated torque sensor 14 renders it possible to achieve a practically two-stage modulation of the fluid pressure or fluid pressure level.

In the embodiment of FIG. 1, the positions of the channels 59, 60 relative to each other, as well as the dimensions and the positions of the centering portions 63, 64 of the axially movable piston 1a relative to each other are selected in such a way that a shifting from admission of fluid into the plenum chamber 22 to admission of fluid into the plenum chambers 22, 23 (and vice vera) takes place when the speed ratio of the transmission is 1:1. However, and as already mentioned hereinbefore, the design of the transmission is such that the shifting into or from the ratio of 1:1 does not take place abruptly, i.e., there is provided a transition zone which is established while the channel 60 is already sealed but the channel 59 is yet to communicate with the plenum chamber 9. In order to ensure a satisfactory operation of the transmission and its torque sensor 14 (which presupposes that the cam disc 19 is free to move axially) within such transition zone, there are provided compensating means which permit a volumetric change of the plenum chamber 23 so that the torque sensor 14 is free to carry out a pumping action. Otherwise stated, those parts which respectively constitute the cylinder and the piston of the torque sensor 14 must be free to move relative to each other in the axial direction of the shaft A.

In the embodiment of the transmission which is shown in FIGS. 1 and 1a, the compensating means comprises a lip seal 67 which is received in a radial groove of the annular member 24 and cooperates with the cylindrical internal surface of the member or part 25 to seal the plenum chambers 22 and 23 from each other. The mounting as well as the design of the seal 67 are such that this seal is effective only in one axial direction of the shaft A but not in the other axial direction. Thus, the lip seal 67 permits an equalization of pressures of fluid bodies in the chambers 22, 23 in one direction but seals the two chambers from each other in the other direction (as seen axially of the shaft A). Of course, an equalization of pressures between the chambers 22, 23 will take place only when the fluid pressure in one of these chambers exceeds the fluid pressure in the other chamber by a predetermined value. It will be seen that the lip seal 67 performs the function of a check valve or one-way valve which prevents the fluid flow from the plenum chamber 22 into the plenum chamber 23 but permits the fluid to flow from the chamber 23 into the chamber 22 when the pressure of fluid in the chamber 23 exceeds that of fluid in the chamber 22 by a preselected value.

Hydraulic fluid can flow from the sealed plenum chamber 23 into the chamber 22 in response to an axial displacement of the cam disc 19 in a direction to the right, as viewed in FIG. 1. If the cam disc 19 is thereupon caused to move back in a direction to the left, the pressure of fluid in the chamber 23 can drop below atmospheric pressure; in fact, the body of hydraulic fluid in the chamber 23 can even contain bubbles of air or another gaseous fluid. However, the development of subatmospheric pressure or the presence of bubbles of gas in the body of fluid in the chamber 23 does not exert an adverse influence upon the operation of the continuously variable transmission and/or upon the operation of its torque sensor.

The just discussed seal 67 which acts as a check valve can be replaced by a standard check valve, e.g., a check valve installed in the annular member 24. The seal 67 is then replaced or replaceable by a seal which is effective in both directions, i.e., against the flow of fluid from the chamber 22 into the chamber 23 as well as in the opposite direction. Still further, it is possible to install a check valve between the channels 35 and 58. All that counts is to ensure that the fluid can flow from the chamber 23 into the chamber 22 but not in the opposite direction.

The preceding description of the mode of operation of the torque sensor 14 indicates that, within the entire portion of the transmission range which involves a change of the ratio from a higher speed to a lower speed (underdrive), the axial force generated at the ramps of the cam discs 18, 19 is assisted solely by the axially effective area which is established by the plenum chamber 22. On the other hand, the axial force applied by the spherical elements 20 to the cam disc 19 is taken up by the axially effective areas of both plenum chambers 22, 23 practically within the entire part of the transmission range which involves an acceleration (overdrive). Consequently, and if one assumes that the starting torque is the same, a shifting of the transmission into a lower speed ratio entails the generation (by the torque sensor 14) of a pressure which is higher during shifting of the transmission into a lower speed ratio than the pressure which is generated during shifting of the transmission into a higher speed ratio. As already mentioned hereinbefore, the transmission of FIGS. 1 and 1a is designed or set up in such a way that the switchover point, at which a shift from communication between and sealing of the plenum chambers 22, 23 from each other takes place, is established when the transmission ratio equals or approximates 1:1. However, by properly selecting the positions and cross-sectional areas of the channels 59, 60 and/or of the corresponding centering portions 63, 64 of the axially shiftable flange 1a, the switchover point can be shifted in either direction within the overall speed ratio shifting range of the continuously variable transmission embodying the present invention.

It is further within the purview of the invention to connect the plenum chambers 22, 23 by at least one channel, conduit or bore containing a suitable valve other than the aforedescribed valves including and/or, operated by the axially movable flange 1a and/or 2a. At the very least, such valve need not be directly controlled by an axially movable flange forming part of a pulley of the continuously variable transmission. For example, it is possible to provide a discrete energy source for actuation of the just described valve which is to replace the valve controlled by or including at least one of the axially movable flanges 1a, 2a. One can employ a suitable electromagnetically, hydraulically or pneumatically operated valve which is actuatable in dependency upon the ratio and or changes of the ratio of the transmission. In accordance with a presently preferred embodiment, one can employ a so-called 3/2-way valve to serve as a means for establishing or interrupting at least one path for the flow of hydraulic fluid between the plenum chambers 22 and 23. Still further, it is possible to employ a pressure regulating valve, for example, in a conduit connecting the channels 35 and 58; this would render it possible to omit or to seal the channels 59 and 60. The just discussed valve can be designed and/or installed in such a way that, when the plenum chambers 22 and 23 are sealed from each other, the valve serves as a means for reducing fluid pressure in the chamber 23. This can be readily achieved by employing a conduit (such as a hose or pipe) which connects an outlet of the valve (such as the aforediscussed pressure regulating valve) with a sump.

Furthermore, if the flow of fluid between the plenum chambers 22 and 23 is to be regulated by a valve that is actuatable from without (rather than by one of the axially movable flanges 1a, 2a), it is possible to influence the operation of such valve by one or more additional parameters, for example, in dependency upon abrupt changes of torque developing in the power train embodying the improved transmission. This renders it possible to prevent a slip of the chain 3 relative to the pulley 1 and/or 2, at least under certain circumstances of use (e.g., within certain ranges of the overall speed ratio) of the continuously variable transmission. At the very least, the undesirable effects of abrupt changes of torque and/or certain other phenomena upon the comfort of the occupant(s) of the motor vehicle and/or upon the useful life of the power train can be greatly reduced.

The torque sensor 14 of the transmission which is shown in FIGS. 1 and 1a is installed upstream of the adjustable pulley 1 on the shaft A and adjacent the axially movable flange 1a of such pulley. However, it is equally within the purview of the invention to install the torque sensor at any one of several other locations in the power train between the prime mover which drives the shaft A and the structure(s) receiving torque from the shaft B. For example, it is possible to install a torque sensor on the shaft B adjacent the axially movable flange 2a. Still further, it is possible to employ several torque sensors, for example, a first torque sensor (such as 14) on the shaft A adjacent the axially movable flange 1a and a second torque sensor on the shaft B adjacent the axially movable flange 2a.

Still further, it is possible to combine a torque sensor having at least two plenum chambers (such as the torque sensor 14 with the plenum chambers 22, 23) with additional means (which can be known per se) for pressure modulation as a function of changes of torque; and/or transmission ratio. For example, the rolling elements 20 can be mounted for radial movement. along radially extending ramps of the cam discs 18, 19 in dependency upon changes of the transmission ratio. Reference may be had, for example, to published German patent application Serial No. 42 34 294.

In the embodiment of FIGS. 1 and 1a, the plenum chamber 6 can be communicatively connected with the torque sensor 14. However, it is equally possible to establish a connection which enables the torque sensor 14 to control the pressure in the plenum chamber 13; the plenum chamber 6 then forms part of the means for changing the ratio of the continuously variable transmission. All that is necessary is to interchange or alternate the terminals of the conduits 52 and 37 at the second adjustable pulley 2.

At least the majority of the component parts of the torque sensor 14 can be made of a metallic sheet material. For example, the cam discs 18 and 19 can be made of sheet metal in a suitable embossing or stamping machine.

FIG. 2 shows a portion of a second continuously variable transmission including an adjustable pulley or sheave 101 corresponding to the pulley 1 shown in FIGS. 1 and 1a. A difference between the transmissions of FIGS. 1, 1a and FIG. 2 is that the torque sensor 114 which is shown in FIG. 2 is adjacent the axially fixed flange 101b of the pulley 101. This torque sensor again comprises two cam discs 118, 119 with one or more spherical elements 120 between the confronting ramps or cams of such cam discs. The cam disc 118 is of one piece with the axially fixed flange 101b of the pulley 101; however, it is equally possible to provide a discrete cam disc 118 which is affixed to the flange 101b and/or to the shaft A.

The sensor 114 receives torque from a prime mover (not shown) by way of a gear 115; the latter receives torque from the prime mover by way of a further gear 115a and is rotatably mounted on the shaft A by a twin ball bearing 116. The shaft A is journalled in a housing 130 by means of a roller bearing 127 adjacent the ball bearing 116 and by a suitable antifriction bearing 128 located to the right of the axially movable flange 101a as viewed in FIG. 2.

The cam disc 119 of the torque sensor 114 is non-rotatably connected with the gear 115 by a pair of of mating gears 140 in such a way that the cam disc 119 has freedom of axial movement toward and away from the axially fixed flange 101b and the cam disc 118. One of the gears 140 can form part of a splined shaft, of a channel toothing or the like. As can be seen in FIG. 2, one of the gears 140 can comprise an external gear (e.g., a spur gear) on an annular extension of the gear 115, and the other of the gears 140 can include or constitute an internal gear mating with the spur gear and provided in the cam disc 119.

The torque sensor 114 comprises two plenum chambers 122, 123 which can be communicatively connected with or sealed from each other in dependency on the momentary ratio of the transmission including the structure of FIG. 2. Reference may be had to the description of the mode of operation of the aforediscussed torque sensor 14 and its plenum chambers 22, 23. The plenum chambers 122, 123 of the torque sensor 114 are defined by an annular member 124 which is fixedly secured to the shaft A, and by portions of the cam disc 119.

The torque sensor 114 receives pressurized hydraulic fluid from a suitable source (not shown) corresponding to the pump 34 of the transmission shown in FIGS. 1 and 1a. Pressurized fluid which is supplied by the source enters and flows in the central channel 135 of the shaft A and thereupon into the plenum chamber 122 by way of at least one radial channel 136 also provided in the shaft A.

The channel 135 further communicates with a channel 140A leading to the plenum chamber 109. of a cylinder-and-piston unit 104 serving to move the axially shiftable flange 101a of the pulley 101 toward the axially fixed flange 101b. The chamber 109 is permanently in communication with the chamber 122 by way of the aforementioned channels 135, 138 and 140A, i.e., the fluid pressure in the chamber 109 always matches that in the plenum chamber 122 of the torque sensor 114.

The cylinder-and-piston unit 104 operates in parallel with a cylinder-and-piston unit 110 which defines a plenum chamber 112. The constructions and the modes of operation of the units 104 and 110 correspond to those of the units 4 and 10 described with reference to FIGS. 1 and 1a.

The radially inner portion 126a of the axially reciprocable cam disc 119 cooperates with the adjacent inlet of a fluid evacuating channel 141 in the shaft A to constitute a flow restrictor whose flow restricting action varies (i.e., increases or decreases) in dependency upon the magnitude of the torque being transmitted by the sensor 114. This enables the torque sensor 114 to select or set a fluid pressure which determines the magnitude of transmitted torque.

The mode of establishing communication between the plenum chambers 122, 123 is similar to that already described with reference to FIGS. 1 and 1a. Reference may be had to channels or bores 155, 156, 157, 158, 159 and 160 which extend axially or radially of the shaft A and establish or terminate communication between the chambers 122, 123 in dependency upon the prevailing transmission ratio. Reference may be had again to the description of construction and mode of operation of the damper shown in FIGS. 1 and 1a. Thus, the centering portions of the axially movable flange 101a cooperate with the shaft portions defining he radially outer ends of the channels 159, 160 to constitute valves having a common axially movable valve member (flange 101a). The switchover point or transition zone is again determined by the dimensions and by the spacing of the centering portions 163, 164 of the axially movable flange 101a. The second plenum chamber 123 is, in effect, connected in parallel with the chamber 122 owing to its connection with the plenum chamber 109.

The transmission of FIG. 2 employs a check valve 168 which performs the function of the seal 67 shown in FIG. 1a. Thus, the valve 168 ensures that, during shifting from operation with a single plenum chamber (122) to operation with two plenum chambers (122, 123) or vice versa, there takes place a pressure equalization in that the fluid is free to flow through the channel 158 and toward the channel 135. Otherwise stated, the check valve 168 normally prevents the fluid from flowing in a direction from the plenum chamber 122 toward the plenum chamber 123; however, when the fluid pressure in the chamber 122 exceeds the fluid pressure in the chamber 123 by a predetermined value, the valve 168 allows the fluid to flow from the chamber 122 to the chamber 123.

FIG. 2 shows a portion of an endless flexible element 103 (such as a chain) which is trained over the pulley 101 as well as over the other pulley (not shown) of the transmission including the structure of FIG. 2. The axially movable flange 101a of the illustrated pulley 101 is spaced apart from but is hydraulically connected with the torque sensor 114 by the channel 135 which is provided in the shaft A.

Figure 3:
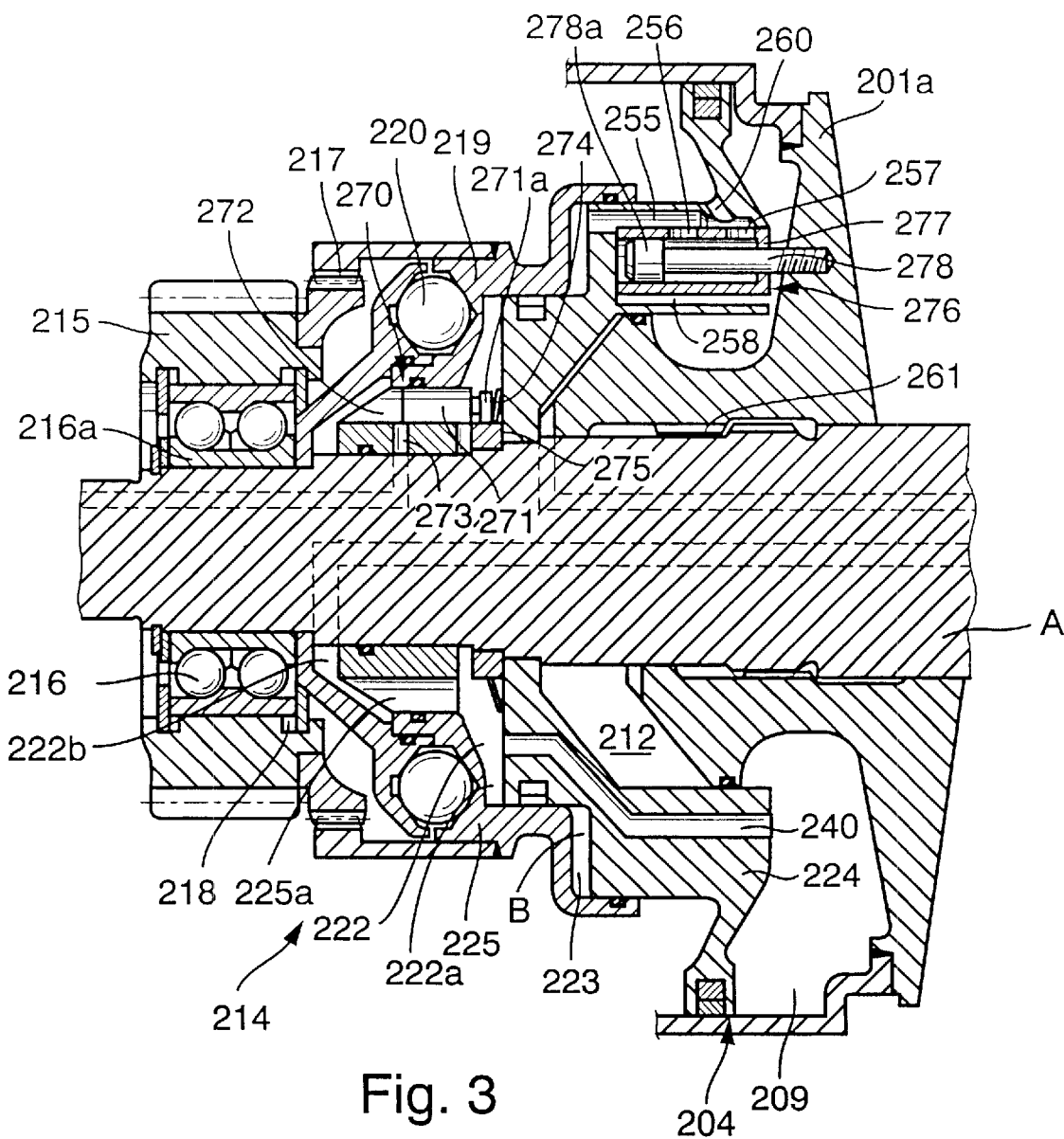

FIG. 3 illustrates a portion of a third continuously variable transmission having a torque sensor 214, an input shaft A, an output shaft (not shown), a first pulley including the axially movable conical flange 201a on the shaft A, a second pulley (not shown) on the output shaft, and an endless flexible element corresponding to the chain 3 or 103. The upper half of FIG. 3 shows the flange 201a at a maximum axial distance from the. (non-illustrated) axially fixed flange, and the lower half of FIG. 3 shows the flange 201a in the other end position at a minimum axial distance from the axially fixed flange of the pulley on the shaft A.

A portion of the peripheral surface of the shaft A is splined, as at 261) and its splines receive complementary teeth in the internal surface of the flange 201a so that the latter is free to move axially of but cannot rotate relative to the shaft A.

The torque sensor 214 is installed between a gear 215 which is driven by the prime mover (not shown), e.g., by way of a gear corresponding to the gear 115a shown in FIG. 2, and the axially movable flange 101a. The gear 215 is non-rotatably connected with the cam disc 219 of the torque sensor 214 by mating internal and external teeth 217 which permit the cam disc 219 to move in the axial direction of the shaft A (reference may be had to the description of the corresponding parts in the torque sensor 114 of FIG. 2).

The axially fixed cam disc 218 of the torque sensor 214 is held against movement longitudinally of the shaft A by an annular bearing member 216a; the latter is surrounded by a twin ball bearing 216 for the gear 215.

An annular chamber 209 is defined in part by the axially movable flange 201a and in part by an annular member 224 which is secured to the shaft A so that it cannot share the axial movements of the flange 201a. The pressure of hydraulic fluid in the chamber 209 is determined by the torque sensor 214. In contrast to the design of the transmission which is shown in FIGS. 1, 1a or in FIG. 2, the annular chamber 209 is located radially outwardly of the annular chamber 212 which is defined by the means (201a, 224) for changing the ratio of the transmission. In other words, the chamber 209 extends radially outwardly well beyond the radially outermost portion of the chamber 212.

The component parts of the torque sensor 214 define two plenum chambers 222 and 223. The fluid in the chamber 222 is pressurized whenever the torque sensor 214 is in the process of transmitting torque; this chamber is defined by annular parts 218, 224 which are non-rotatably affixed to the shaft A and by a part 225 which is installed between and is rotatable relative to the parts 218, 224. The part 225 constitutes or includes the axially shiftable cam disc 219 of the torque sensor 214. The parts 218, 224 and 225 include axially extending annular portions which are fitted into each other to define the aforementioned plenum chambers 222, 223 of the torque sensor 214. Sealing elements (e.g., O-rings) are inserted between the axially movable part 225 and the axially fixed parts 218, 224.

The plenum chamber 222 is divided into two annular sections 222a and 222b which are communicatively connected to each other by an axially parallel bore or hole 225a in the part 225. The section 222b of the plenum chamber 222 is disposed between the annular part 225 (i.e., between the axially movable cam disc 219) and the part 218 (which latter constitutes the axially fixed cam disc of the torque sensor 214) as seen in the axial direction of the shaft A. The section 222a of the plenum chamber 222 is located (again as seen in the axial direction of the shaft A) between the annular part 224 and the axially shiftable cam disc 219 (part 225). In other words, the sections 222a, 222b of the annular plenum chamber 222 are disposed at opposite sides of the cam disc 219 as seen in the axial direction of the shaft A.

FIG. 3 shows clearly that the effective radial surface of the section 222a exceeds that of the section 222b of the plenum chamber 222. Such difference entails that it is possible to apply to the axially movable cam disc 219 a shifting force acting in the axial direction of the shaft A. Such axial shifting force ensures that the spherical rolling elements 220 are clamped between the confronting profiled surfaces of the cam discs 218 and 219 of the torque sensor 214.

The torque sensor 214 further comprises a throttle valve 270 which determines the pressure of fluid at least in the plenum chamber 222 as a function of prevailing torque and includes a pin-shaped projection 271 extending into a bore 272 provided in the axially movable cam disc 219. This projection 271 is fixedly secured to the part 224. The bore 272 communicates with the section 222b of the plenum chamber 222 and further communicates with a radial bore 273 serving as a means for permitting evacuation of fluid from the chamber 222. The projection 271 seals the radial bore 273 to an extent which is dependent upon the applied torque. Thus, the rate of outflow of hydraulic fluid through the radial bore 273 decreases in response to an increase of the applied torque. Therefore, the plenum chamber 222 accumulates a cushion of hydraulic fluid serving to apply a required axial force to the cam disc 219. At least one connecting bore or passage 240 ensures that the pressure of fluid in the chamber 209 matches the pressure of fluid (such as oil) in the plenum chamber 222 of the torque sensor 214.

The right-hand end portion of the projection 271 (namely the end portion adjacent the annular part 224) is mounted and positioned in such a way that it is held against play in the axial direction of the shaft A but has a certain freedom of radial movement. This mounting of the projection 271 ensures that the latter can be mounted in such a way that it is properly centered in the bore 272 without risking a jamming, canting or clamping in the part 225.

The projection 271 is maintained in requisite axial position by an energy storing device (e.g., a diaphragm spring or Belleville spring) 274 which urges a suitably configured head 271a of the projection axially of the shaft A and against a shoulder 275. Such biasing of the projection 271 further entails a retention against excessive movement in the radial direction of the shaft A, namely a radial movement which exceeds that required for proper centering of the projection 271 in the bore 272.

In order to ensure the establishment and interruption of communication between the plenum chambers 222 and 223 of the torque sensor 214 as a function of the momentary speed ratio of the transmission, there is provided at least one eccentrically mounted reversing valve 276 having a valve housing or body 277 and a reciprocable valving element or piston 278 in the housing. The piston 278 is affixed to and thus shares the axial movements of the flange 201; on the other hand, the housing or body 277 is stationary because it is affixed to the axially fixed annular member or part 224. When the flange 201a assumes the left-hand end position shown in the upper part of FIG. 3 (i.e., when the transmission is set to drive the non-illustrated second shaft (corresponding to the shaft B in the transmission of FIGS. 1 and 1a) at a speed less than the RPM of the shaft A), the pressure in the chamber 223 is relieved by way of the channels 255 and 260 which are communicatively connected with each other by way of the reversing valve 276. To this end, the valve 276 then establishes a path 256 for flow of fluid to the channel 256 and a path 257 for the flow of fluid to the channel 260.

When the flange 201a is thereupon moved from the position shown in the upper part of FIG. 3 toward the position shown in the lower part of this Figure, the head 278a of the piston 278 of the valve 276 seals the path 256 (such as a radial hole or bore in the housing or body 277) to the channel 255 after the flange 201a has completed a certain part of its movement to the end position nearest to the (non-illustrated axially fixed flange on the shaft A. As the flange 201a continues its movement to the right, as viewed in FIG. 3, the path 256 is gradually exposed but the path 257 (e.g., a bore or hole in the housing or body 277) is sealed by the head 278a of the piston 278 from the path 256. This ensures that no fluid can escape via channel or passage 260. When the path 256 is no longer obstructed, the chamber 209 communicates with the plenum chamber 223 by way of the channel 258 which extends between the chamber 209 and the valve 276, the path 256 and the channel 255. Thus, at such time, the pressure in the chamber 223 matches that in the chamber 222. In the embodiment of FIG. 3, the chamber 222 is in direct communication with the chamber 209 of the cylinder-and-piston unit 204, namely by way of the channel 240. Thus, communication between the chambers 222 and 223 is established by way of the chamber 209. Admission of fluid into the cylinder-and-piston unit 204 takes place by way (actually through) the torque sensor 214.

Figure 4:
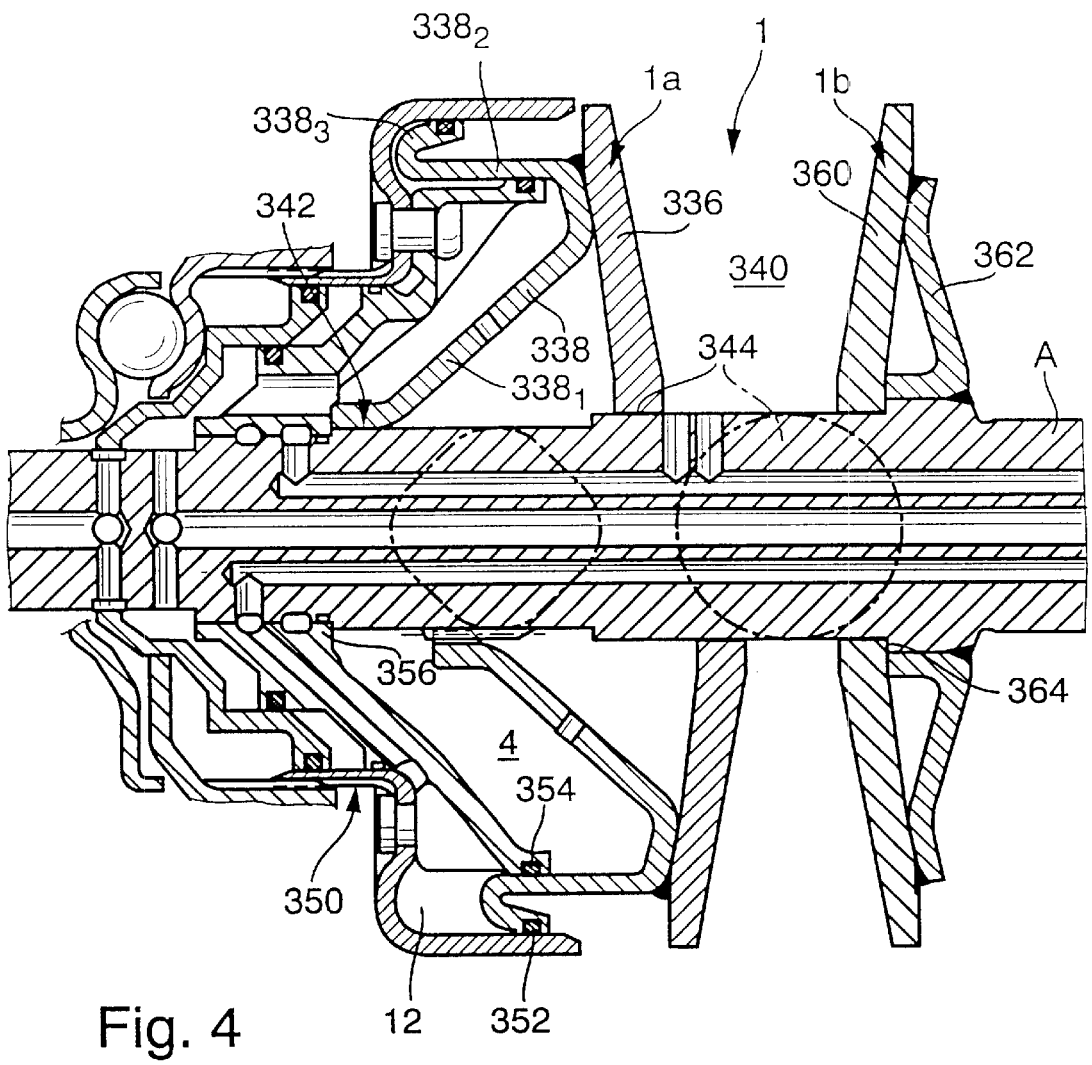

FIG. 4 illustrates a portion of a continuously variable transmission which, in many respects, corresponds to the transmission of FIGS. 1 and 1a. Therefore, those parts of the transmission shown in FIG. 4 which are identical with or clearly analogous to the corresponding parts of the transmission of FIGS. 1 and 1a are denoted by similar reference characters. A difference between the transmission of FIGS. 1, 1a on the one hand and the transmission of FIG. 4 on the other hand is that each of the flanges 1a, 1b shown in FIG. 4 is assembled of several parts or components consisting of a metallic sheet material.

The axially movable flange 1a comprises a frustoconical component 336 and a composite support 338 for the component 336. The latter can constitute a simple sheet metal stamping which is hardened along that (right-hand) surface which confronts the radially outwardly diverging annular space 340 for the respective looped portion of the endless flexible element, such as a chain (not shown in FIG. 4).

The support 338 constitutes a substantially S-shaped constituent or element which is made of sheet metal in a suitable drawing or analogous machine. The element 338 comprises a bracing portion $338_1$ which slopes at an oblique angle from the rear side of the frustoconical component 336 toward the periphery of the shaft A. The radially outer part of the portion $338_1$ is welded or otherwise bonded or secured to the outer third of the component 336 to thereupon extend (at $338_2$) in substantial parallelism with the axis of the shaft A away from the component 336 to terminate in a substantially C-shaped part $338_3$ extending radially outwardly of the part $338_2$.

The support or constituent or element 338 is non-rotatably mounted on the shaft A by a polygonal profile 342 which enables the parts 336, 338 to move as a unit toward and away from the axially fixed flange 1b. The radially inner portion of the component 336 has a circular profile 344 which is adjacent the polygonal profile 342 and enables the component 336 to move axially of the shaft A while the component 338 and its polygonal profile 342 cooperate with the complementary polygonal portion of the adjacent part of the shaft A to ensure that the component 336 cannot turn about the axis of this shaft.

The polygonal profile 342 can be replaced with an annulus of internal teeth mating with a set of external teeth on the adjacent portion of the shaft A. Still further, it is possible to dispense with the polygonal profile 342 and with the complementary external polygonal profile of the shaft A and to establish, instead, a non-rotatable connection between the radially inner portion of the component 336 and the adjacent portion of the shaft A so that the component 336 ensures that neither of the components 336, 338 can turn on the shaft A but that these components can move jointly in the axial direction of the shaft toward and away from the axially fixed flange 1b. For example, the non-rotatable connection between the component 336 and the shaft A can comprise a polygonal profile corresponding to the profile 342 and a complementary polygonal profile on the adjacent portion of the shaft A or an internal gear on the component 336 and a mating external gear on the adjacent portion of the shaft A.

The support 338 can constitute the only means for bracing the component 336, and this support can cooperate with an abutment 350 which is affixed to the shaft A and serves as a means for limiting the extent of axial movement of the flange 1a in a direction to the left, as viewed in FIG. 4, i.e., away from the axially fixed flange 1b. Furthermore, the abutment 350 cooperates with the support 338 to define the plenum chambers 9, 12 of the respective cylinder-and-piston units (reference should be had to the description of FIGS. 1 and 1a). The chamber 12 is sealed by a sealing element 352 between a portion of the abutment 350 and the part $338_3$ of the support 338, and by a sealing element 354 which is installed between the part $338_2$ of the support 338 and the adjacent portion. of the abutment 350.

The chamber 9 is located radially inwardly of the chamber 12 and is sealed by the aforementioned sealing element 354, by the polygonal profile 342 of the support 338, by the annular radially inner portion 344 of the frustoconical component 336, and by a welded seam between the support 338 and the component 336.

An advantage of the structure which is shown in FIG. 4 is that it contributes significantly to lower cost of the pulley. Furthermore, the illustrated sheet metal parts can be produced, finished and installed with a higher degree of accuracy than component parts which are made by casting or forging. Furthermore, that surface of the component 336 which confronts the axially fixed flange 1b can be finished and hardened at a fraction of the cost of a cast or forged axially movable flange The structure which is shown in FIG. 4 can be modified in a number of ways without departing from the spirit of the invention. For example, the chambers 9 and 12 need not be completely sealed from each other; instead, it is possible to provide therebetween a bore, channel or the like to thus establish a direct connection between such chambers. This is often of advantage because only one of the chambers 9 and 12 must be connected to a source of pressurized hydraulic fluid.

The reference character 356 denotes in FIG. 4 a stop or shoulder which is provided on the abutment 350 and serves to arrest the parts 336, 338 when the component 336 reaches a position (shown in the upper half of FIG. 4) at a maximum axial distance from the fixed flange 1b.

The fixed flange 1b of the transmission shown in FIG. 4 comprises a frustoconical component 360 which is or which can be a mirror image of the component 336 (with reference to a plane which is normal to the axis of the shaft A) and a support 362 having a substantially radially outwardly extending portion or leg welded or otherwise affixed to the component 360 and an annular portion which surrounds the adjacent portion of and is welded or otherwise affixed to the shaft A.

It is clear that, in addition to welding the annular portion of the support 362 to the shaft A (or in lieu of such welding), the shaft A can have a polygonal portion (such as that which is surrounded by the polygonal profile 342) which prevents rotation of a complementary polygonal profile on the support 362. The shaft A is then further provided with suitable stops which prevent the flange 1b from moving axially toward or away from the flange 1a. Furthermore the rotation preventing connection between the shaft A and the flange 1b can comprise an external gear on the shaft and an internal gear in the annular portion of the support 362; such connection must further comprise some means for ensuring that the flange 1b remains in a selected optimum axial position, i.e., at an optimum distance from the abutment 350.

FIGS. 5a to 5k illustrate other presently preferred designs of the axially movable and axially fixed flanges and certain presently preferred modes of movably or fixedly securing such flanges to the respective shafts.

Figure 5A:
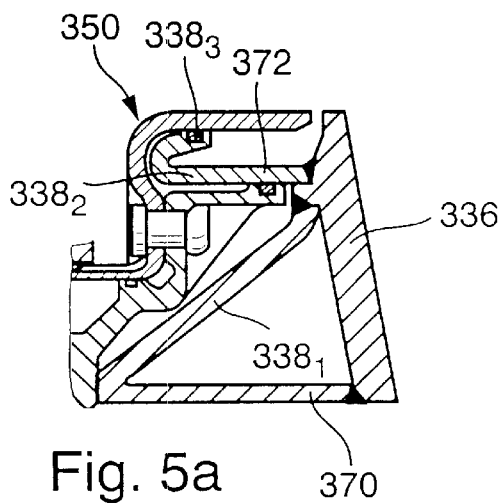
FIG. 5a is a fragmentary axial sectional view of an axially movable conical flange forming part of an adjustable pulley for use in the improved continuously variable transmission and of an axially fixed support for the axially movable flange.

Referring to FIG. 5a, there is shown a two-piece support 370 which is made of a metallic sheet material in a deep drawing operation and includes a first section $338_1$ with an annular portion axially movably surrounding the shaft A (not shown) and a frustoconical portion. Both portions of the section $338_1$ are welded to the adjacent side of the frustoconical component 336 of the axially movable flange shown in FIG. 5a.

The intermediate section $338_2$ and the radially outermost portion $338_3$ of the composite support are made of sheet metal and together form a structure 372 having a substantially J-shaped cross-sectional outline. The structure 372 is welded to the frustoconical component 336. Furthermore, the structure 372 extends into the adjacent portion of the abutment 350.

Figure 5B:
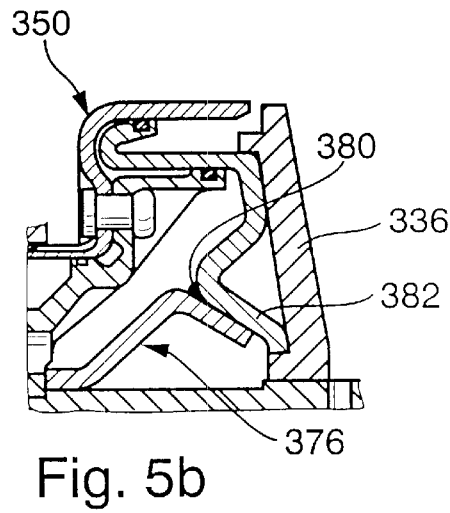

FIG. 5b shows a support 376 which is assembled of two parts each of which can be made of a metallic sheet material. The two parts of the support 376 are welded or otherwise securely affixed to each other, as at 380, and include two parallel portions one (382) of which abuts a shoulder on an annular ledge forming the radially innermost part of the frustoconical component 336. The separable connection between the support 376 and the component 336 can be established before the latter is axially movably but non-rotatably mounted on the respective shaft of the transmission embodying the structure of FIG. 5b. The abutment 350 of FIG. 5b can be identical with or similar to the abutment 350 shown in FIG. 5a.

Figure 5C:
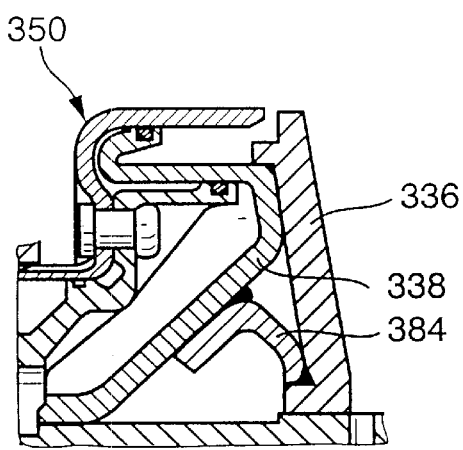
FIG. 5c illustrates a further modification of a combination of an axially movable flange and an axially fixed support therefor.

A difference between the structure which is shown in FIG. 5c and the corresponding structure of the transmission shown in FIG. 4 is that the support 338 of FIG. 5c includes a brace 384 which is welded to the radially innermost portion of the frustoconical component 336.

Figure 5D:
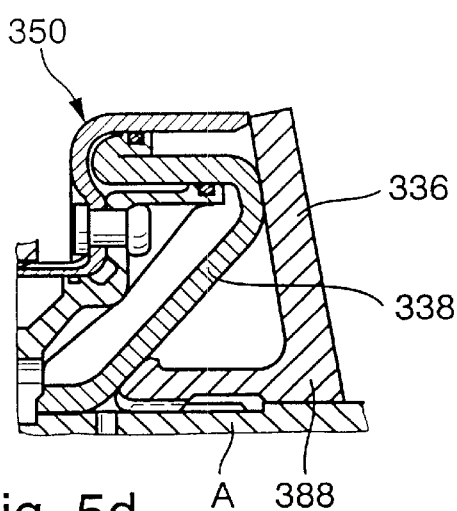
FIG. 5d is a sectional view similar to that of FIG. 5c but showing a different combination of an axially movable conical flange and a support.

The frustoconical component 336 which is shown in FIG. 5d has an annular radially innermost portion 388 which is welded or otherwise affixed to the adjacent radially innermost portion of the support 338 and surrounds the shaft A. The construction of the abutment 350 can be the same as that of the similarly referenced abutment shown in FIG. 4, 5a, 5b or 5c.

Figure 5E:
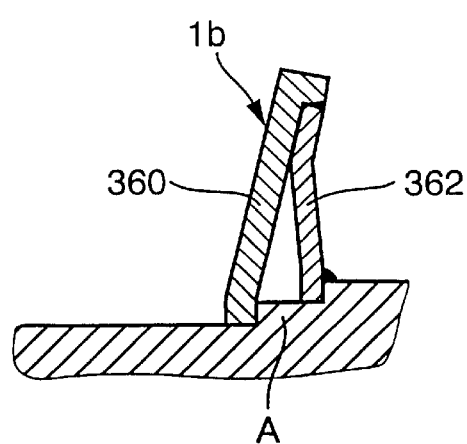
FIG. 5e is a fragmentary axial sectional view of an axially fixed conical flange and of a support which secures such flange to the respective shaft of a continuously variable transmission.

The axially fixed flange 1b which is shown in FIG. 5e departs from that which is shown in FIG. 4 in that the support 362 includes a radially outer portion abutting and being welded to a narrow collar at the radially outermost portion of the frustoconical component 360, and a radially innermost portion which abuts an external shoulder of and is welded to the shaft A.

Figure 5F:
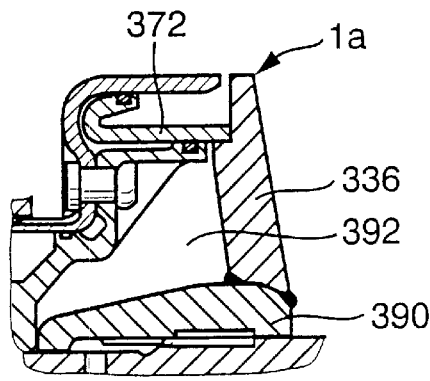
FIG. 5f is a fragmentary axial sectional view similar to that of FIG. 5a, 5b, 5c or 5d but showing a different combination of an axially movable conical flange and a support therefor.

FIG. 5f shows a conical flange 1a which includes an annular portion 390 axially movably surrounding the respective shaft and welded to a frustoconical component 336. The structure including the parts 336, 390 is reinforced by a set of radially extending webs or ribs 392. The construction of the part 372 is or can be identical with that of the similarly referenced part shown in FIG. 5a.

Figure 5G:
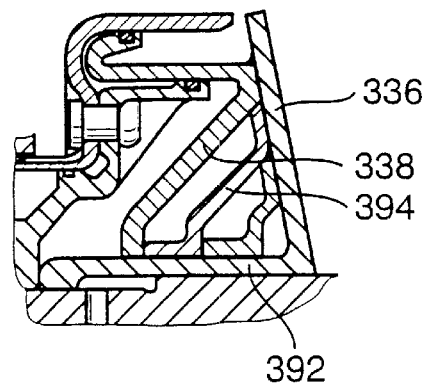
FIG. 5g is a fragmentary axial sectional view of a flange-support combination constituting a modification of the structure shown in FIG. 5f.

In the embodiment of FIG. 5g, the frustoconical component 336 is assumed to have been turned out in a deep drawing machine and is of one piece with the annular portion 390. The support 338 of FIG. 5g is welded to the frustoconical component 336 and to the abutment 350; this support is reinforced by one or more frustoconical annular portions 394 extending between the rear side of the component 336 and the annular portion 390.

An advantage of the embodiment which is shown in FIG. 5g is that it can employ components made of a relatively thin metallic sheet material. This contributes to a reduction of the cost and weight as well as to simplicity of conversion of sheet metal blanks into the constituents of the flange shown in FIG. 5g.

Figure 5H:
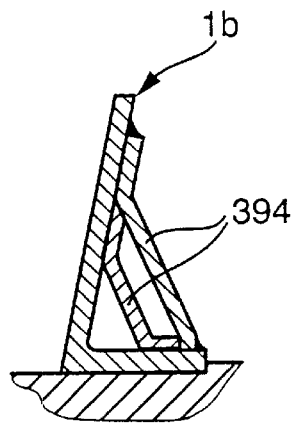
FIG. 5h is a view similar to that of FIG. 5e but showing a different mode of affixing a conical flange to the respective shaft of a continuously variable transmission.

FIG. 5h shows a portion of an axially fixed flange 1b wherein the support 362 of FIG. 4 is replaced with a support analogous to that described with reference to FIG. 5g, namely a support 394 having one or more frustoconical annular portions extending between the rear side of the frustoconical component 360 and outer side of an annular component 360a fixedly secured to the respective shaft.

Figure 5I:
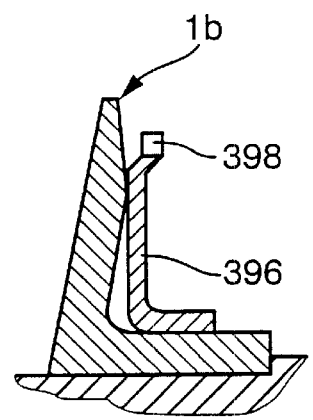
FIG. 5i illustrates a structure constituting a modification of that shown in FIG. 5h.

FIG. 5i shows a portion of an axially fixed flange 1b wherein the support 396 for the axially fixed frustoconical component 360 includes a toothed radially outer portion 398 which can serve as a part of a parking block or as an input member for an RPM sensor. The toothed radially outer portion 398 or the entire support 396 can be mass produced in a stamping machine.

Figure 5J:
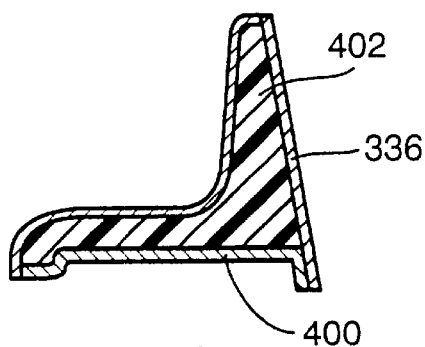
FIG. 5j is a schematic fragmentary sectional view showing an axially movable conical flange and a cushion of foamed material therefor.
Figure 5K:
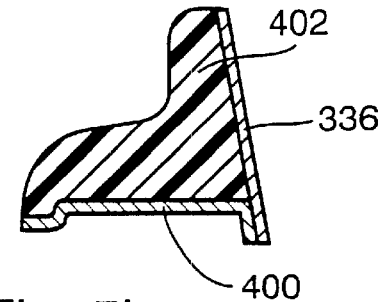
FIG. 5k illustrates a modification of the structure shown in FIG. 5j.

FIGS. 5j and 5k show two embodiments of an axially movable flange 1a having a frustoconical component 336 of sheet metal, an annular portion 400 which is welded to the radially innermost portion of the component 336 and axially movably surrounds the respective shaft (not shown), and a body 402 of foam which adheres to the rear side of the component 336 and to the radially outer side of the annular portion 402. The cross-sectional area of the body 402 of foam in the flange 1a of FIG. 5j is somewhat different from that of the body of foam shown in FIG. 5k.

The foam can be made of a metallic material (such as aluminum, magnesium and/or others), of an inorganic material, of an organic material, of a plastic material and/or others. An advantage of the flanges which are shown in FIGS. 5j and 5k is that the bodies of foam can serve as noise suppressing and/or stabilizing constituents. Furthermore, by selecting a foam having an expansion coefficient different from that of the sheet metal parts 336 and 400, such difference between the two expansion coefficients can be relied upon to accurately select the extent of stabilization of the respective flange. This, in turn, renders it possible to reduce the thickness of the sheet metal material which is utilized for the making of the parts 336, 400 and hence the weight of the entire flange.

It is clear that the features shown in FIGS. 5j and 5k (the utilization of bodies 402 of foamed material) can be resorted to with equal advantage in connection with the axially movable and axially fixed flanges of pulleys in a continuously variable transmission.

Figure 6:
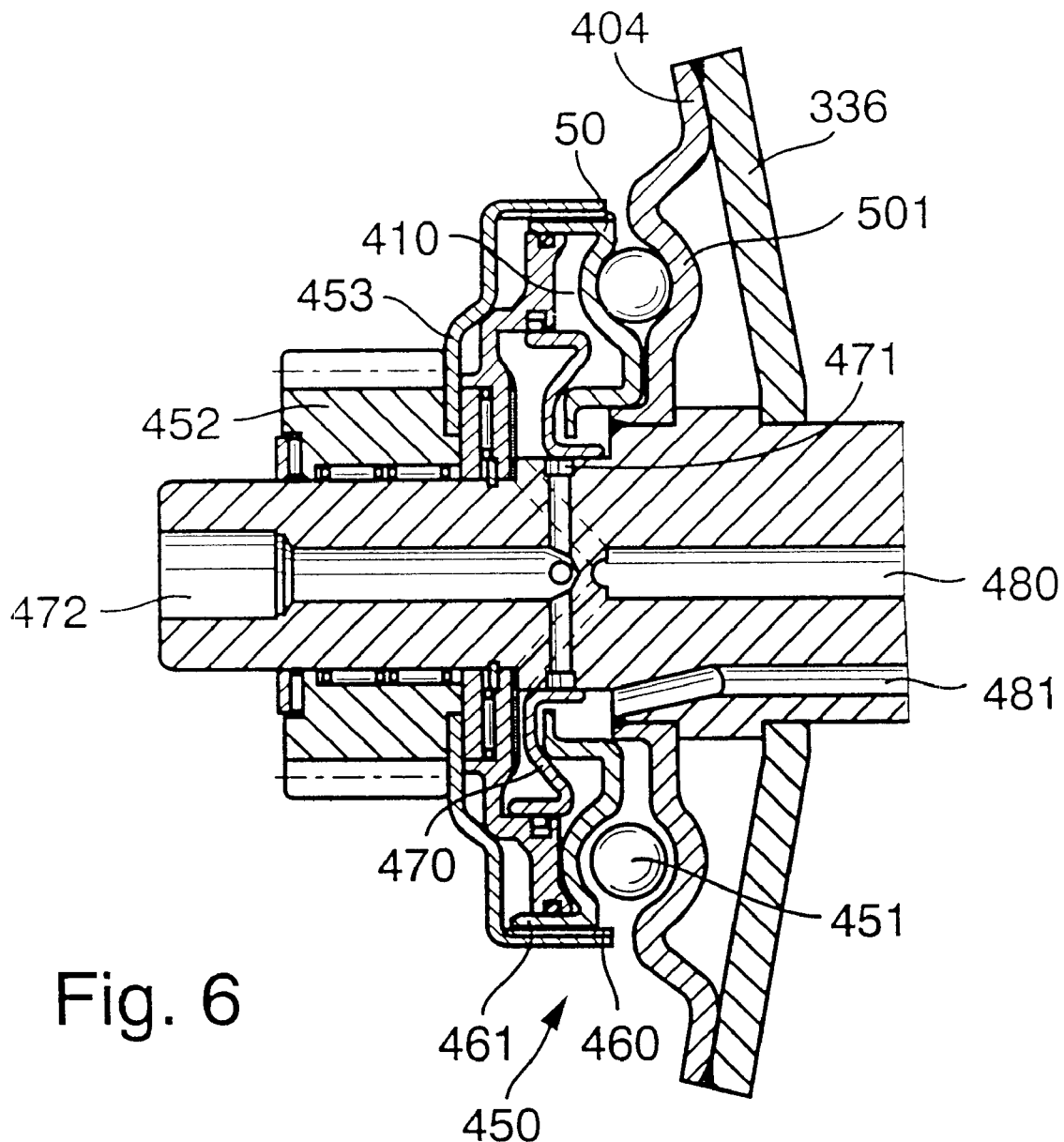
FIG. 6 is an axial sectional view of a torque sensor which can be utilized in the continuously variable transmission embodying the present invention.

FIG. 6 shows a portion of a continuously variable transmission wherein the support 404 for the frustoconical component 336 of a flange is provided with a profiled portion 501 having a concave depression for a portion of a rolling element 406 (e.g., a sphere). When the component 336 and the support 404 are caused to turn relative to the abutment 500 or vice versa, this entails a change of pressure of hydraulic fluid in a plenum chamber 410, i.e., the support 404 can be said to form part of a torque sensor 450. The mode of operation of such torque sensor is or can be the same as that of the torque sensor 14 shown in FIGS. 1, 1a, of the torque sensor 114 shown in FIG. 2 or of the torque sensor 214 shown in FIG. 3.

The parts 500, 501 in the structure shown in FIG. 6 constitute the two cam discs of the torque sensor 450, and each of these cam discs can be made of a metallic sheet material. The torque sensor 450 is driven by a gear 452 which transmits torque to a sheet metal part 453; the radially outermost portion of the part 453 has an internal gear 460 in mesh with an external gear (such as a spur gear) 461 of the cam disc 500. Any angular displacement of the cam discs 500, 501 relative to each other results in an axial displacement of a piston 470 which rotates with the cam disc 500. The axially movable piston 470 can seal or expose the radially outer end of at least one bore 471 provided in the shaft 700 for the flange including the frustoconical component 336 of FIG. 6. The bore or bores 471 communicate with an axially extending channel 472 which is machined into the shaft 700 and serves to evacuate hydraulic fluid from the chamber 410. An additional channel 480 in the shaft 700 serves to supply pressurized hydraulic fluid from a pump (not shown) into the chamber 410, and a further channel 481 is used to connect the plenum chamber 410 with a second chamber of the torque sensor 410 if the latter constitutes a two-stage torque sensor) or to a plenum chamber of a two-stage torque sensor provided in addition to the torque sensor 450.

The flange which is shown in FIG. 6 is fixed to the shaft 700 against angular movement as well as against axial movement relative to such shaft. However, the torque sensor 450 of FIG. 6 can be assembled and can cooperate with the axially movable flange (not shown) of the pulley which is mounted on the shaft 700.

In either event, the torque sensor 450 can constitute a pressure reducing valve because the pressure in its chamber 410 can be regulated by the axially movable piston 470.

The number of those parts in the novel continuously variable transmission which are or which can be made of sheet metal can vary within a wide range, depending upon the desired cost, weight and/or other parameters of the transmission. The same holds true for the nature and the number of connections (such as welded connections and/or others) between neighboring sheet metal components and/or between components which are made of sheet metal and components which are castings, forgings or are otherwise made from a material other than sheet metal.

Continuously variable transmissions which can be modified to embody one or more features of the present invention are disclosed, for example, in commonly owned U.S. Pat. Nos. 5,046,991, 5,169,365, 5,217,412, 5,295,915, 5,667,448, 5,674,155 and 5,711,730. The disclosures of all U.S. and foreign patents and/or patent applications (including the commonly owned German priority application Serial No. 198 10 172.4 filed Mar. 10, 1998) identified in this specification, as well as all commonly owned granted U.S. and foreign patents and all commonly owned published and unpublished U.S. and foreign patent applications are intended to be interpreted as having been incorporated here in by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of transmissions and, therefore, such adaptations should and are intended to be comprehended within the meaning and range of equivalence of the appended claims.

What is claimed is:

1. A transmission comprising:
   a shaft rotatable about a predetermined axis;
   a pulley having a first flange affixed to said shaft and a second flange rotatable with and movable axially of said shaft toward and away from said first flange, said flanges having confronting conical surfaces bounding an annular space having a width, as seen in the direction of said axis, which varies in response to movement of said second flange relative to said first flange, at least one of said flanges comprising a plurality of interconnected components consisting at least in part of a metallic sheet material, at least one first component of said interconnected components comprising one of said conical surfaces, at least one second component of said interconnected components supporting the at least one first component on the side facing away from the annular space;
   an endless flexible element trained over said pulley and including a looped portion received in said annular space; and
   means for moving said second flange, including a support affixed to said second flange, said second flange being disposed between said support and said first flange, said support and said second flange defining a plurality of annular plenum chambers and said moving means further comprising means for sealing said chambers, said sealing means extending in at least one of a plurality of directions including radially and axially of said shaft.

2. The transmission of claim 1, wherein said a least one flange is said second flange and said second flange has a side confronting said support and being defined by at least one of said components.

3. The transmission of claim 2, wherein said at least one component comprises a conical disc and said support comprises a supporting part non-rotatably mounted on said shaft, a frustoconical part connected with a median portion of said at least one component and extending from said at least one component axially and radially of said shaft toward said axis, and a second component remote from said axis and defining one of said plenum chambers with said frustoconical part.

4. The transmission of claim 1, wherein said second flange comprises a frustoconical component adjacent said space, said support being non-rotatably mounted on said shaft and including a frustoconical first portion extending from a median portion of said frustoconical component toward said shaft, a second portion substantially parallel to said axis and extending from said frustoconical portion away from said space, and a third portion extending from said second portion radially outwardly and away from said shaft, one of said chambers surrounding said second portion of said support and another of said chambers being located radially inwardly of said one chamber.

5. The transmission of claim 1, wherein said at least one flange is said second flange and said second flange comprises a frustoconical component adjacent said space, said support comprising a frustoconical first portion extending from a median portion of said frustoconical component toward said shaft, a second portion extending in substantial parallelism with said axis and away from said space, and a third portion bent radially outwardly from said second portion, one of said chambers being defined at least in part by said first and second portions of said support and another of said chambers being defined by said second and third portions of said support.

6. The transmission of claim 1, wherein said support consists of a single piece of a metallic sheet material.

7. The transmission of claim 1, wherein said support consists of a plurality of parts made of a metallic sheet material.

8. The transmission of claim 1, wherein said support includes first, second and third portions consisting of a metallic sheet material and disposed at different radial distances from said axis, said second and third portions of said support being of one piece and separate from said third portion of said support.

9. The transmission of claim 1, wherein said second flange includes a frustoconical component having a substantially circular radially inner portion surrounding said shaft.

10. The transmission of claim 1, wherein said second flange includes a radially inner portion having a polygonal profile surrounding and movable axially of a complementary profile on a portion of said shaft.

11. The transmission of claim 1, wherein at least one of said flanges includes a radially inner portion having a cylindrical internal surface surrounding a complementary external surface of said shaft and merging into a substantially frustoconical component forming part of the respective flange.

12. The transmission of claim 1, wherein at least one of said flanges comprises a frustoconical component adjacent said space and at least one substantially frustoconical stabilizing portion for said frustoconical component.

13. The transmission of claim 1, wherein said first flange comprises a frustoconical component adjacent said space and a supporting device for said frustoconical component, said shaft having a first substantially annular shoulder abutting a portion of said frustoconical component and a second substantially annular shoulder abutting a portion of said supporting device.

14. The transmission of claim 1, wherein at least one of said flanges comprises a frustoconical component adjacent said space and a body of foam attached to a surface of said frustoconical component facing away from said space.

15. The transmission of claim 1, wherein said first flange includes a portion remote from said shaft and a gear provided at said remote portion of said first flange.

16. The transmission of claim 1, wherein said second flange includes a frustoconical component adjacent said space and a member consisting at least in part of sheet metal and forming part of a torque sensor, said member being adjacent a side of said frustoconical component facing away from said space.

17. The transmission of claim 1, wherein said first flange includes a frustoconical component adjacent said space and a member consisting at least in part of sheet metal and forming part of a torque sensor, said member being adjacent a side of said frustoconical component facing away from said space.

18. A transmission comprising:

a shaft rotatable about a predetermined axis;

a pulley having a first flange affixed to said shaft and a second flange rotatable with and movable axially of said shaft toward and away from said first flange, at least one of said flanges comprising a plurality of interconnected components consisting at least in part of sheet metal, at least one first component of said interconnected components comprising one of said conical surfaces and at least one second component of said interconnected components comprising an axial support for said at least one first component; and an endless flexible torque transmitting element having a portion trained over said pulley and disposed between said flanges.

19. The transmission of claim 18, wherein each of said flanges comprises a plurality of interconnected components consisting at least in part of sheet metal.

20. The transmission of claim 18, further comprising a torque sensor, one of said flanges including a portion forming part of said torque sensor.

* * * * *